July 19, 1932. C. D. YOUNG 1,868,267
FREIGHT HANDLING SYSTEM
Filed Nov. 8, 1929 2 Sheets-Sheet 1
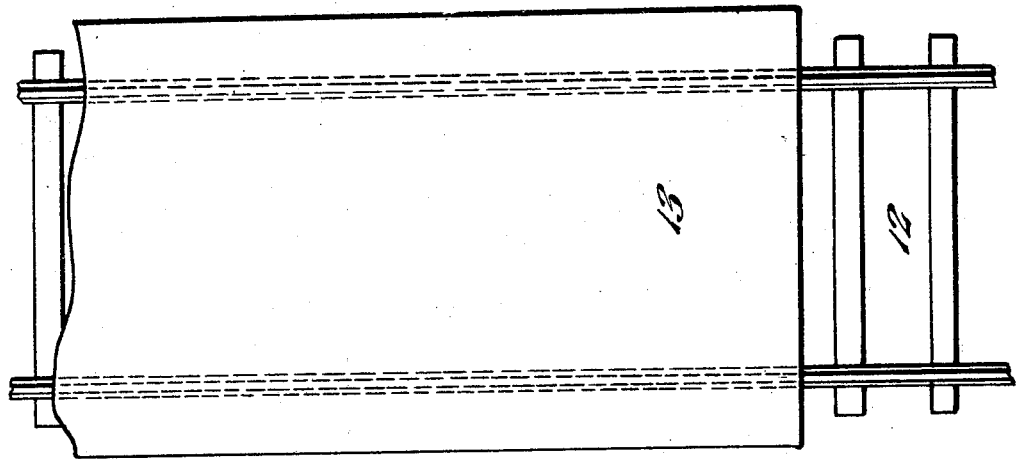
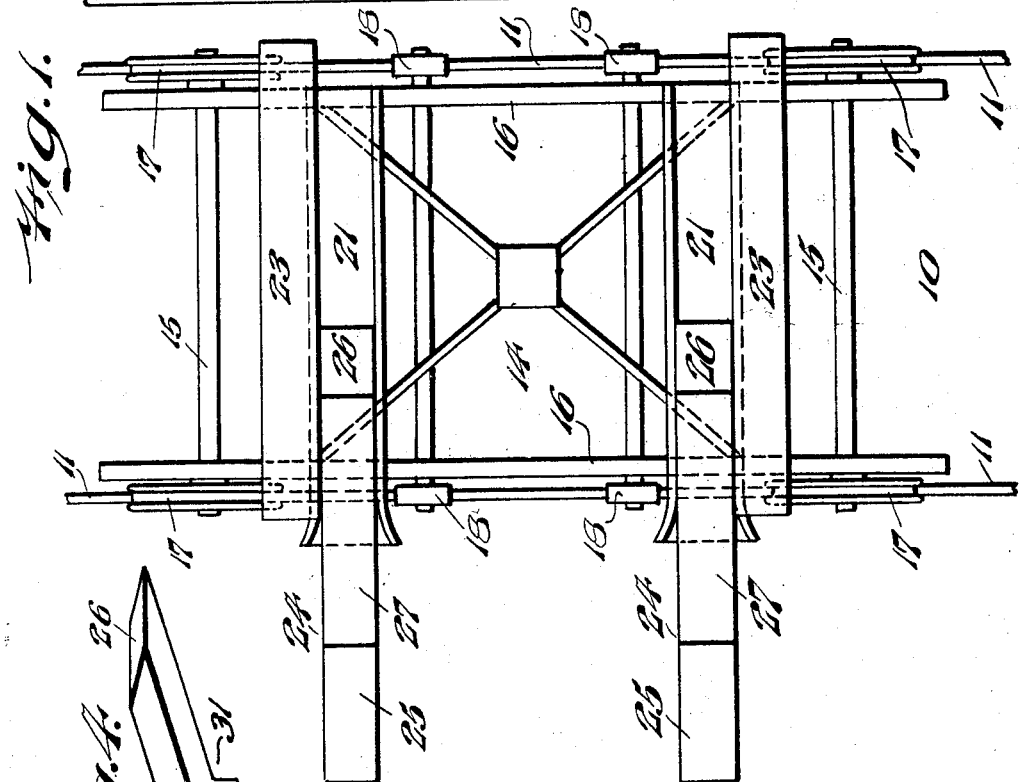
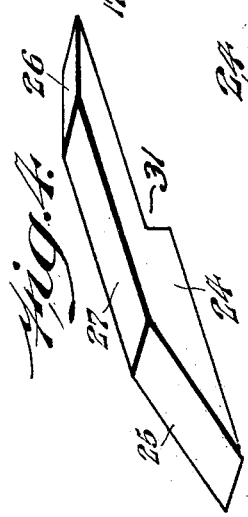
INVENTOR.
CHARLES D. YOUNG.
BY
Robert M. Barr
ATTORNEY.

July 19, 1932.  C. D. YOUNG  1,868,267
FREIGHT HANDLING SYSTEM
Filed Nov. 8, 1929  2 Sheets-Sheet 2
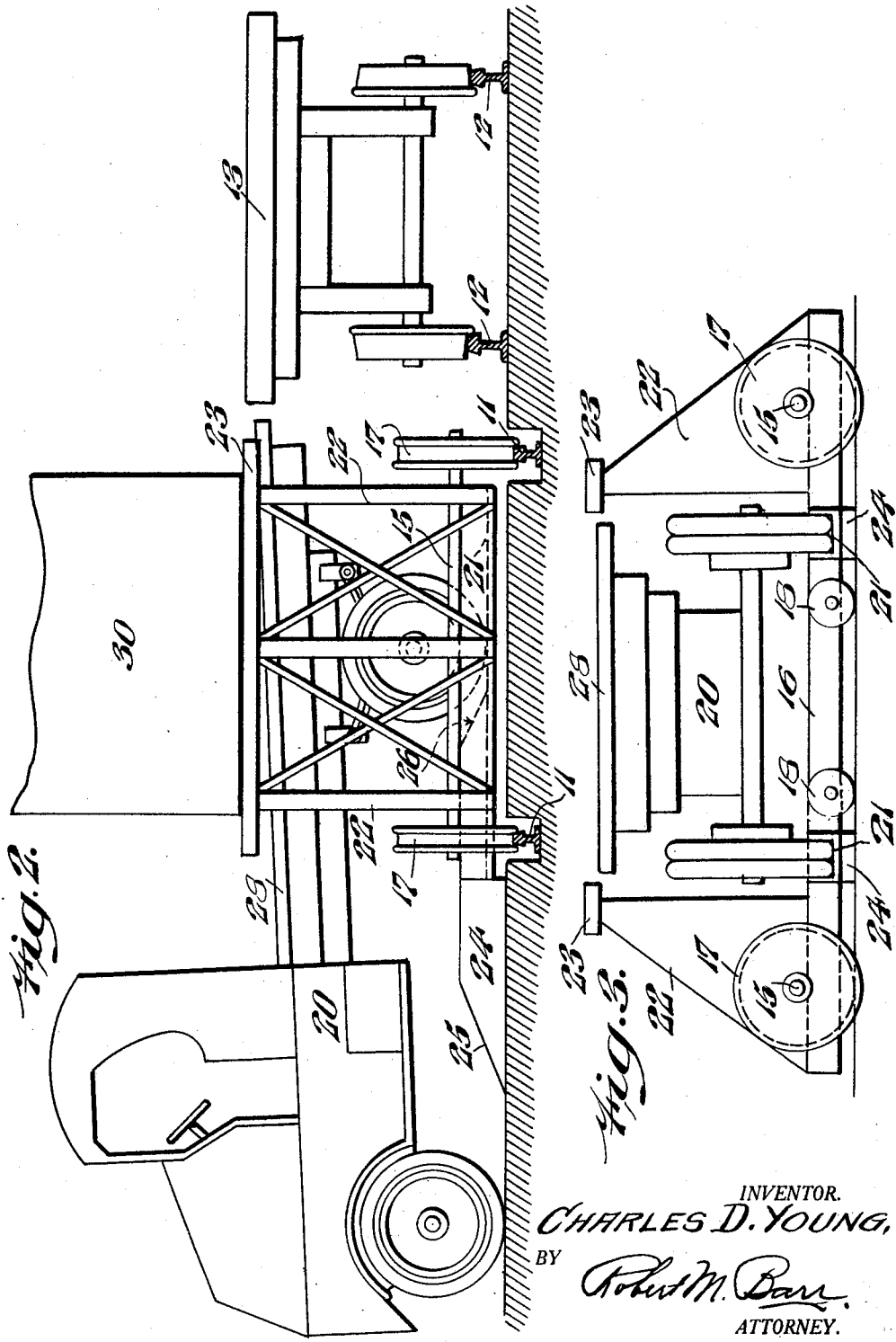
INVENTOR.
CHARLES D. YOUNG,
BY
ATTORNEY.

Patented July 19, 1932

1,868,267

UNITED STATES PATENT OFFICE

CHARLES D. YOUNG, OF HAVERFORD, PENNSYLVANIA

FREIGHT HANDLING SYSTEM

Application filed November 8, 1929. Serial No. 405,552.

The present invention relates to the handling of freight and more particularly to the loading and unloading of containers to and from a freight car and to and from a truck.

In the transporting and handling of containers such as are intended for transfer and delivery to auto trucks considerable time has been lost at way stations due to the lack of efficient facilities for carrying out loading and unloading operations. For example, it is quite general to have but one container to be delivered at a particular station, and therefore the freight car carrying that container must be brought adjacent the receiving platform. This in itself is not a particularly difficult operation but where the way station is provided with receiving rails for transferring the container to a truck then objectional train shifting is required to properly "spot" (that is align) the container with the pair of receiving rails. The reverse of this operation, namely, delivering a container from the receiving rails to the freight, is attended with the same difficulties as to the spotting. Valuable time is thus lost and the cost of handling is materially increased. Furthermore, where such loading and unloading takes place from a main track it is especially imperative that the freight train do its loading and unloading in a minimum time so that the track can be cleared for through passenger traffic.

Some of the objects of the present invention are to provide an improved container loading and unloading mechanism; to provide simplified means for transferring a freight container to and from a freight car and to and from an automobile truck or other vehicle; to provide a receiving assembly for containers wherein provision is made for accurate spotting of a freight car in a minimum of time; to provide a receiving assembly for containers having an inherent flexibility to meet different conditions at its place of use; to provide means for loading and unloading a container whereby the stop of a freight train at a station for such loading and unloading is reduced to a minimum; to provide means operative in a minimum space for bringing about the accurate spotting of a freight car with respect to a receiving support; to provide means adjustable lengthwise of a track for cooperation with the loading and unloading of a container upon and from a freight car on the track, and including means variable vertically for changing the relation between the container and a receiving support for such container; and to provide other improvements as will hereinafter appear.

In the accompanying drawings Fig. 1 represents a plan of a receiving assembly embodying one form of the present invention; Fig. 2 represents a side elevation of a truck in operative relation to a spotting truck beside a railroad track; Fig. 3 represents a side elevation of one form of spotting truck embodying features of the present invention; and Fig. 4 represents a perspective of one form of block for varying the loading and unloading relation of a truck with respect to the spotting device.

Referring to the drawings one form of the invention is shown comprising a length of track 10 having rails 11 located at a freight station and arranged in parallel relation to a railroad track 12 which may be a main track, a siding or terminal as the case may be. The track 10 is preferably in such close proximity to the railroad track 12 as will make the transfer of containers 13 to a freight car from a spotting truck 14, or vice versa, as simple and easy as possible.

The spotting truck 14 consists of a suitable bogie frame 15, preferably of I-beam construction the side sills 16 of which mount front and rear pairs of wheels 17 to run upon the track 10. Also auxiliary wheels 18 are provided intermediate the front and rear wheels in order to distribute the load which the sills would otherwise have to carry as unsupported bridge members.

For the purpose of supporting and guiding the rear wheels of a vehicle 20, such as a motor truck, upon the bogie frame, two trough shaped runways 21 are fixed transversely of the frame 15 with a gauge distance corresponding to the gauge of vehicle 20. The side sills 16 of the frame 15 are suitably recessed to seat the respective runways 21 so that the supporting level of the runways is preferably just above the ground level.

In order to support a container upon the spotting truck 14 in position for ready transfer to a freight car, two frames 22 are mounted as uprights transversely of the frame 15 and in parallel relation to the runways 21 but spaced apart to receive the width of the conveying truck 20 between them. The spacing apart of the frames 22, however, is within the width limit of the container carried by the truck so that when the latter leaves the space between the frames 22 its container will be left supported by horizontally disposed rails 23 lying in the same horizontal plane and respectively carried by and forming the top of the frames 22.

As a means for automatically loading and unloading a container upon and from the vehicle 20, a pair of transfer rails 24 are employed, each of which is provided with two ramp sections 25 and 26 and an intermediate horizontal section 27. The height of the horizontal section 27 is such as to bring the level of the vehicle platform 28 above the level of the two rails 23 whereby, when the rails 24 are placed in alinement respectively with the runways 21, a vehicle backing into the space between the frame 22 will automatically deposit its container 30 upon the rails 23. Thus during such a movement the rear vehicle wheels will ride upwardly upon the ramp sections 25, then travel along the horizontal sections 27 to bring the container over the rails 23, and then down the ramp section 26 into the runways 21. This downward movement leaves the container 30 upon the rails 23 and the vehicle can then be driven out by first taking up the ramp transfer rails 24 so that the vehicle platform maintains a level below that of the container. In removing a container the vehicle is run into the runways 21 and the transfer rails 24 are then placed in operative position so that upon reversing the direction of the vehicle its platform will be raised to pick up the container and carry it away as the vehicle leaves the transfer rails. Preferably each transfer rail 24 has a recess 31 cut in the bottom at one end such that this end can seat in its rail 23 while maintaining the desired horizontal condition of the face 27.

In connection with the transfer rails 24 it should be noted that these are portable and therefore can be operatively placed wherever the spotting truck 14 is located. This, together with the fact that the truck 14 can be run to any selected position upon its rails 10, gives a wide range of operation and the desired flexibility to the system.

From the foregoing it will be evident that a freight train can be stopped at a station without any particular relation between any car and a loading or unloading point and hence the ordinary difficulty of bringing a train to a spotting position is eliminated. The present spotting truck can take any convenient place to receive its container from a motor truck and the transfer from one vehicle to the other is made automatically by reason of the portable ramp transfer rails 24 and then after the delivery truck has been driven away, the transfer rails can be removed and the spotting truck then moved along its track until it brings its container opposite the place upon a freight car where it is intended to be placed for shipment. The reverse of these operations takes place when containers are to be unloaded from a freight car and once the containers are placed upon the spotting truck, the latter can be moved to the place where the truck is to be loaded or if the location is convenient, the transfer rails can be placed in position directly opposite the unloading place and the truck there backed into the spotting truck to more directly receive its load.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. In a loading and unloading system, a railroad track, a spotting truck arranged to travel beside said track to take a predetermined position beside a freight car on said track, vehicle receiving guide rails mounted transversely of said truck, means carried by said truck for supporting a container, and means associated with said guide rails for causing a vehicle to enter said guide rails with a variation in the height of its platform whereby a container is automatically deposited upon or removed from said supporting means.

2. In a loading and unloading system, a railroad track, a spotting truck arranged to travel beside said track to take a predetermined position beside a freight car on said track, vehicle receiving guide rails mounted transversely of said truck, means carried by said truck for supporting a container, and means including ramps associated with said guide rails for causing a vehicle to enter said guide rails with a variation in the height of its platform, whereby a container is automatically deposited upon or removed from said supporting means.

3. In a loading and unloading system, a railroad track, a spotting truck arranged to travel beside said track to take a predetermined position beside a freight car on said track, vehicle receiving guide rails mounted transversely of said truck, means carried by said truck for supporting a container, and means including double ramps associated with said guide rails for causing a vehicle to enter said guide rails with a variation in the height of its platfom, whereby a container is automatically deposited upon or removed from said supporting means.

4. In a loading and unloading system, a railroad track, a spotting truck arranged to travel beside said track to take a predetermined position besides a freight car on said track, vehicle receiving guide rails mounted transversely of said truck, means carried by said truck for supporting a container, and portable transfer means arranged to direct the wheels of a vehicle onto said guide rails.

5. In a loading and unloading system, a railroad track, a spotting truck arranged to travel beside said track to take a predetermined position beside a freight car on said track, vehicle receiving guide rails mounted transversely of said truck, means carried by said truck for supporting a container, portable transfer means arranged to direct the wheels of a vehicle onto said guide rails, and ramps on said transfer means for giving said vehicle a rising and falling movement at a predetermined place with respect to said supporting means.

Signed at Philadelphia, county of Philadelphia, State of Pennsylvania, this 6th day of November, 1929.

CHARLES D. YOUNG.